US012673721B2

(12) United States Patent
Kapsalis et al.

(10) Patent No.: US 12,673,721 B2
(45) Date of Patent: Jul. 7, 2026

(54) METHOD FOR GUIDING A MOTOR VEHICLE

(71) Applicant: AMPERE S.A.S., Boulogne Billancourt (FR)

(72) Inventors: Dimitrios Kapsalis, Guyancourt Cedex (FR); John-Jairo Martinez, Grenoble (FR); Vincente Milanes, Valladolid (ES); Olivier Sename, Saint Martin d'Hères (FR)

(73) Assignee: AMPERE S.A.S., Boulogne Billancourt (FR)

( * ) Notice: Subject to any disclaimer, the term of this patent is extended or adjusted under 35 U.S.C. 154(b) by 0 days.

(21) Appl. No.: 18/836,858

(22) PCT Filed: Jan. 13, 2023

(86) PCT No.: PCT/EP2023/050780
§ 371 (c)(1),
(2) Date: Aug. 8, 2024

(87) PCT Pub. No.: WO2023/151892
PCT Pub. Date: Aug. 17, 2023

(65) Prior Publication Data
US 2025/0145213 A1    May 8, 2025

(30) Foreign Application Priority Data
Feb. 9, 2022    (FR) ...................................... 2201136

(51) Int. Cl.
B62D 6/00        (2006.01)
(52) U.S. Cl.
CPC .................................... B62D 6/003 (2013.01)

(58) Field of Classification Search
None
See application file for complete search history.

(56) References Cited

U.S. PATENT DOCUMENTS

| | | | | |
|---|---|---|---|---|
| 4,703,822 A | * | 11/1987 | Kawamoto | ............ B62D 7/159 180/412 |
| 5,021,987 A | * | 6/1991 | Chan | ...................... G06F 17/16 708/607 |
| 8,165,755 B2 | * | 4/2012 | Garcia Estebanez | .. B62D 7/159 701/42 |

(Continued)

FOREIGN PATENT DOCUMENTS

WO        WO 2021/228657 A1    11/2021

OTHER PUBLICATIONS

International Search Report issued Feb. 20, 2023, in PCT/EP2023/050780, 2 pages.

(Continued)

*Primary Examiner* — Kurt Philip Liethen
(74) *Attorney, Agent, or Firm* — Oblon, McClelland, Maier & Neustadt, L.L.P.

(57)        ABSTRACT
A method guides a motor vehicle equipped with a module for controlling lateral movement and with a steering system. The steering system limits an absolute value of a yaw rate of the motor vehicle to a maximum yaw rate. A rate of change in the yaw rate is between a minimum value and a maximum value. The method includes iteration of the following: selecting a rate of change in yaw rate, maximizing a virtual reference yaw rate depending on the rate of change in yaw rate and on maximum yaw rate, and transmitting the virtual reference yaw rate to the module for controlling lateral movement.

8 Claims, 8 Drawing Sheets

(56)     References Cited

U.S. PATENT DOCUMENTS

| | | | | |
|---|---|---|---|---|
| 12,214,793 | B2 * | 2/2025 | Hrvatinic .......... | B60W 50/0098 |
| 2003/0074127 | A1 * | 4/2003 | Kin ......................... | B60T 8/172 |
| | | | | 701/80 |
| 2009/0326762 | A1 * | 12/2009 | Garcia Estebanez .. | B62D 7/159 |
| | | | | 701/42 |
| 2012/0109411 | A1 * | 5/2012 | Tokimasa ............ | B60W 10/184 |
| | | | | 701/1 |
| 2014/0288785 | A1 * | 9/2014 | Bretzigheimer .... | B60T 8/17558 |
| | | | | 701/48 |
| 2015/0161895 | A1 | 6/2015 | You et al. | |
| 2016/0107682 | A1 | 4/2016 | Tan et al. | |
| 2017/0072941 | A1 * | 3/2017 | White ................... | B60W 30/02 |
| 2018/0297638 | A1 | 10/2018 | Fujii | |
| 2019/0256094 | A1 * | 8/2019 | Kasaiezadeh Mahabadi .............. | |
| | | | | B60W 30/182 |
| 2019/0265042 | A1 * | 8/2019 | Prasad .................. | B60W 30/10 |
| 2020/0307691 | A1 * | 10/2020 | Kalabic ............. | B62D 15/0255 |
| 2020/0406969 | A1 * | 12/2020 | Ersal ..................... | B60W 10/20 |

OTHER PUBLICATIONS

Preliminary Report issued Sep. 21, 2022, in corresponding French Patent Application No. FR 2201136 (with English Translation of Category of Cited Documents) 3 pages.

Yang Yang Wang et al., "Study on Lane Change Trajectory Planning Considering of Driver Characteristics", SAE 2010 Commercial Vehicle Engineering Congress Sae Technical Papers, US, vol. 1, 2018, pp. 1-10. doi:10.4271/2018-01-1627, ISSN 0148-7191, XP055696474.

* cited by examiner

METHOD FOR GUIDING A MOTOR VEHICLE

The invention relates to a method for guiding a motor vehicle. The invention further relates to a device for guiding a motor vehicle. The invention also relates to a computer program implementing one of the mentioned methods. Lastly, the invention relates to a recording medium on which such a program is recorded.

Lateral guidance of motor vehicles in particular comprises automation of lane-change maneuvers. Existing control solutions allowing lane-change maneuvers to be performed generally privilege the comfort of the maneuver at the rate of convergence toward the targeted lane. To that end, these solutions are mainly based on automatic lateral-control techniques that limit the capabilities of the electric power-assisted steering system of the vehicle, and in particular the rate of rotation of the steering wheel of the vehicle.

However, when the lateral distance between the traffic lane of the vehicle and its destination lane is large, limiting the rate of rotation of the steering wheel of the motor vehicle may cause lateral-guidance failures (such as a deviation of the path of the vehicle from the computed path or even departure from the destination lane).

A lane-change-assist method that involves the driver of the vehicle, who retains primary control of the steering wheel, is known from document U.S. Pat. No. 8,855,883B2. In addition to the fact that it does not apply to autonomous vehicles, this assist method does not optimize the lane-change maneuver with respect to the capabilities of the electric power-assisted steering system of the vehicle and does not allow the duration of the maneuver to be minimized.

The aim of the invention is to provide a guiding device and method that remedies the above drawbacks and improves the guiding devices and methods known in the prior art. In particular, the invention makes it possible to provide a device and method that are simple and reliable and applicable to autonomous vehicles, that optimize the lane-change maneuver with respect to the capabilities of the power-assisted steering and that minimize the duration of the lane-change maneuver.

To this end, the invention relates to a method for guiding a motor vehicle equipped with a velocity sensor, with a gyroscope, with a geolocating means, with a path-planning system, with a module for controlling lateral movement, with a steering system and with wheels, the steering system limiting an absolute value of a yaw rate of the motor vehicle to a maximum yaw rate, a rate of change in the yaw rate being between a minimum value and a maximum value, the rate of change in yaw rate being incremented by a set adjustment increment.

The method comprises iteration of the following steps:

a first step of selecting a rate of change in yaw rate, a second step of maximizing a virtual reference yaw rate depending on the rate of change in yaw rate and on the maximum yaw rate, a third step of transmitting the virtual reference yaw rate to the module for controlling lateral movement.

In one embodiment, the guiding method comprises, following the third step, a fourth step of generating, by means of the module for controlling lateral movement, a first steering command from the virtual reference yaw rate, and a fifth step of converting, by means of the steering system, the first steering command into a second steering command consisting of a movement of a steering shaft connected to the steered wheels.

The first step may comprise:

a first sub-step of receiving a first steering command sent by the module for controlling lateral movement in a previous iteration of the method, a second sub-step of receiving a second steering command applied by the steering system in said previous iteration of the method, and a third sub-step of computing the rate of change in yaw rate depending on a previous rate of change in yaw rate computed in the previous iteration of the method, on the minimum value of the rate of change in yaw rate, on the maximum value of the rate of change in yaw rate, on the set adjustment increment, and on a difference between the first and second steering commands.

The third sub-step of computing the rate of change in yaw rate may comprise:

comparing the first steering command and the second steering command sent in a previous iteration of the method, and comparing the previous rate of change in yaw rate to the minimum value of the rate of change in yaw rate.

Subsequently:

if the first steering command is different from the second steering command, and if the previous rate of change in yaw rate is greater than the minimum value, then the rate of change in yaw rate is equal to the difference between the previous rate of change in yaw rate and the set adjustment increment, otherwise if the first steering command is equal to the second steering command, and if the previous rate of change in yaw rate is less than the maximum value, then the rate of change in yaw rate is equal to the sum of the previous rate of change in yaw rate and of the set adjustment increment, otherwise the rate of change in yaw rate is equal to the previous rate of change in yaw rate.

In one embodiment, the steering system is capable of processing commands delivered by the module for controlling lateral movement at a frequency less than or equal to a maximum processing frequency, and the step of maximizing the virtual reference yaw rate comprises:

modeling a continuous closed-loop system comprising a continuous state model of the motor vehicle and a continuous model of the module for controlling lateral movement, defining a discretized closed-loop system by discretizing the model of the continuous closed-loop system at a frequency less than or equal to the maximum processing frequency, determining the virtual reference yaw rate by means of an optimization calculation, in particular for maximizing this rate.

The invention further relates to a device for guiding a motor vehicle, the motor vehicle being equipped with a velocity sensor, with a gyroscope, with a geolocating means, with a path-planning system, with a module for controlling lateral movement, with a steering system and with steered wheels. The device comprises hardware and/or software components implementing the method such as defined above.

The invention also relates to a computer program product comprising program code instructions recorded on a computer-readable medium so as to implement the steps of the method such as defined above when said program is run on a computer. The invention also relates to a computer program product downloadable from a communication network and/or recorded on a data medium readable by a computer and/or executable by a computer, comprising instructions that, when the program is executed by the computer, cause the latter to implement the method such as defined above.

The invention further relates to a computer-readable data-recording medium on which is recorded a computer program comprising program code instructions for implementing the method such as defined above. The invention further relates to a computer-readable recording medium comprising instructions that, when they are executed by a computer, cause the latter to implement the method such as defined above.

The invention further relates to a signal from a data medium, carrying the computer program product such as defined above.

The appended drawings illustrate, by way of example, one embodiment of a guiding device according to the invention and one mode of execution of a guiding method according to the invention.

FIG. 1 shows a motor vehicle equipped with a guiding device according to the invention.

FIG. 2 defines the longitudinal and lateral velocities and yaw rate of the motor vehicle.

Figure 1:
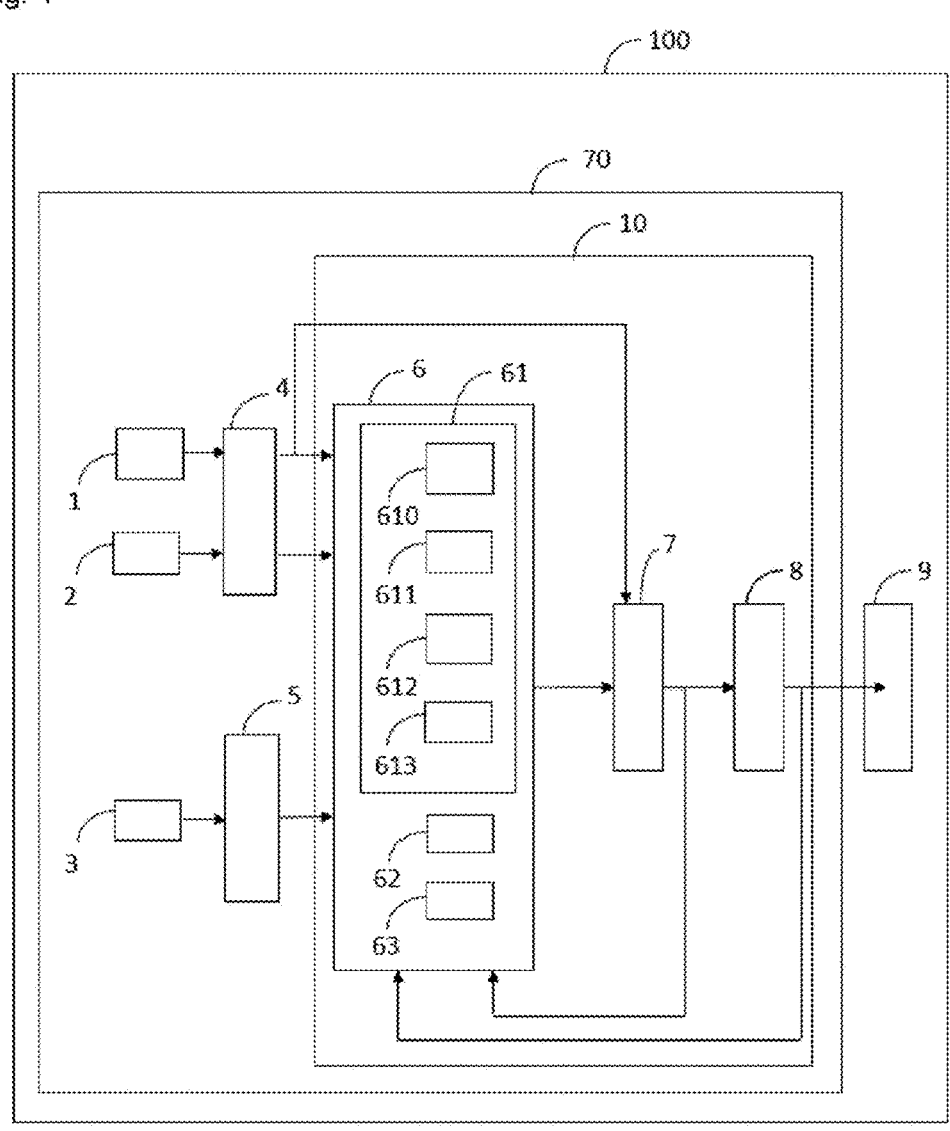

One example of a motor vehicle 100 equipped with one embodiment of a device for guiding a motor vehicle is described below with reference to FIG. 1.

The motor vehicle 100 may be a motor vehicle of any type, including a passenger vehicle, a commercial vehicle, a truck or even a means of public transport such as a bus or shuttle. In the described embodiment, the motor vehicle 100 is an autonomous vehicle and will be designated the "autonomous vehicle" in the remainder of the description.

This illustration is therefore non-limiting. In particular, the motor vehicle could be a non-autonomous vehicle equipped with an advanced driver-assistance system, in particular an advanced driver-assistance system corresponding to a level higher than or equal to level-2 automation, i.e. corresponding to partial automation of the vehicle.

Figure 2:
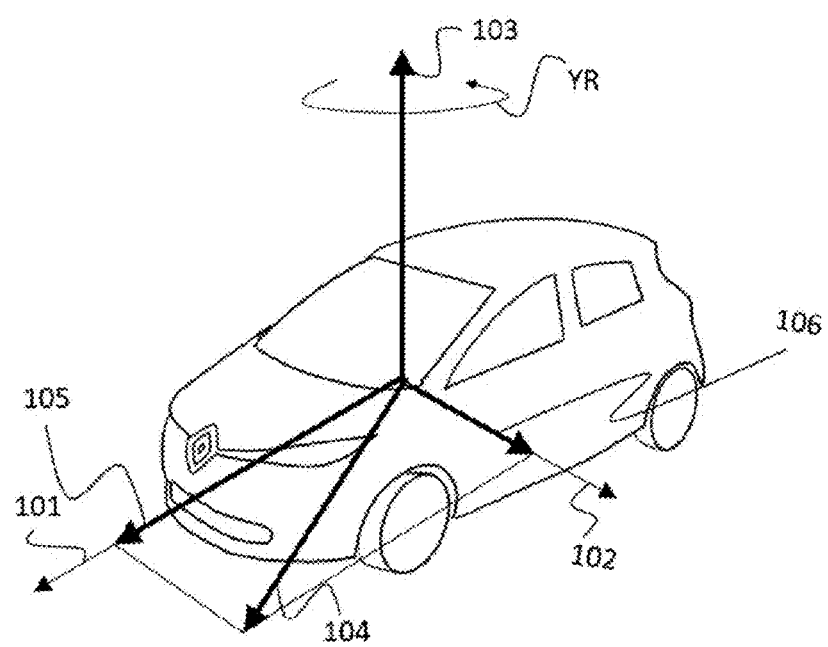

With reference to FIG. 2, one rate and two velocities relating to the autonomous vehicle 100 and that are used in the remainder of this document will now be defined. The axis called the longitudinal axis 101 of the ego vehicle is defined as its longitudinal axis of symmetry, oriented toward in front of the vehicle.

The axis called the lateral axis 102 of the ego vehicle transects the longitudinal axis 101 at right angles at a point located at the center of gravity of the ego vehicle, and it is oriented toward the left of the ego vehicle. The axis called the vertical axis 103 of the ego vehicle transects a plane defined by the axes 101 and 102 at right angles at a point located at the center of gravity of the ego vehicle, and it is oriented toward above the ego vehicle.

The velocity vector 104 of the ego vehicle projected onto the longitudinal axis 101 defines the longitudinal component 105 of the velocity vector, which is called the longitudinal velocity.

The velocity vector 104 of the ego vehicle projected onto the lateral axis 102 defines the lateral component 106 of the velocity vector, which is denoted the lateral velocity LAT_SPEED in the remainder of this document. The yaw rate YR of the autonomous vehicle 100 is defined as the rate of rotation of the vehicle about the vertical axis 103 in the counter-clockwise direction in the reference frame defined by the axes 101 and 102.

The autonomous vehicle 100 comprises a guiding system 70 that controls a steering angle of the steered wheels 9 of the vehicle.

In the remainder of this document, the term "wheel" is used to designate the steered wheels of the autonomous vehicle 100.

The guiding system 70 mainly comprises the following components:
- a velocity sensor 1,
- a gyroscope 2,
- a geolocating system 3,
- a path-planning module 4, denoted the "planning module 4" in the remainder of this document,
- a model 5 for estimating the lateral dynamics of the autonomous vehicle 100, denoted the "estimating model 5" in the remainder of this document,
- a module 7 for controlling lateral movement, denoted the "control module 7" or "controller" in the remainder of this document,
- a steering system 8 including an actuator, in particular an electric actuator, and
- a computing unit 6 comprising a microprocessor 61, a memory 62 and communication interfaces 63 allowing the microprocessor 61 to communicate with the planning module 4, the estimating model 5, the control module 7 and the steering system 8.

The guiding system 70 and the interactions between its components are more specifically described with reference to FIGS. 3 and 4.

Figure 3:
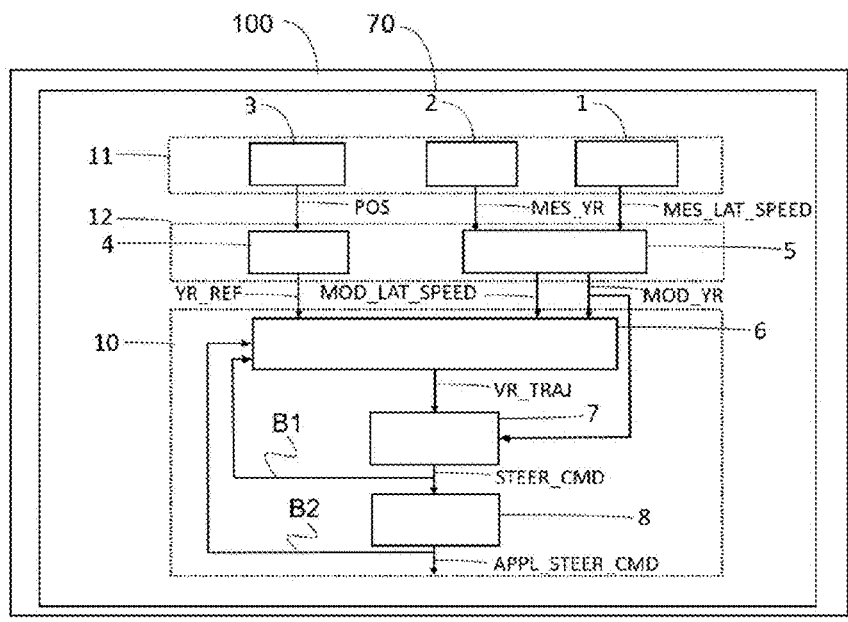
FIG. 3 is an alternative representation of a motor vehicle equipped with a guiding device according to the invention.

FIG. 3 illustrates a distribution of the components of the guiding system 70 between three processing layers:
- a measuring first layer comprising the velocity sensor 1, the gyroscope 2, and the geolocating system 3,
- a data-processing second layer comprising the planning module 4 and the estimating model 5,
- a third layer consisting of a system 10 for controlling lane changes, which comprises the microprocessor 6, the control module 7 and the steering system 8.

The velocity sensor 1 delivers a measurement of the instantaneous velocity MES_SPEED of the autonomous vehicle 100, and in particular a measurement of the lateral velocity MES_LAT_SPEED of the autonomous vehicle 100.

The gyroscope 2 allows the instantaneous yaw rate MES_YR of the autonomous vehicle 100 to be measured.

The geolocating system 3 allows the geographic position POS of the autonomous vehicle 100 on a map to be determined. In one embodiment, the geolocating system 3 is a GPS.

The planning module 4 determines a reference path REF_TRAJ of the autonomous vehicle 100, from the instantaneous position POS delivered by the geolocating system 3. The reference path REF_TRAJ is the path used to generate movement commands, depending on current kinematic parameters of the autonomous vehicle 100, and a planned route. Advantageously, the reference path REF_TRAJ is determined in light of operational and/or tactical decisions made by the autonomous vehicle, such as a lane change, or avoidance of an obstacle. The reference path computed by the planning module 4 in particular comprises a reference yaw rate REF_YR to be applied to follow the reference path. The module 4 transmits the reference yaw rate REF_YR to the microprocessor 6.

The estimating model 5 computes a modeled value of the yaw rate MOD_YR and of the lateral velocity MOD_LAT_SPEED from the velocity measurement(s) MES_SPEED and/or MES_LAT_SPEED and yaw-rate measurement MES_YR delivered by the velocity sensor 1 and gyroscope 2. The modeled values of the yaw rate MOD_YR and of the lateral velocity MOD_LAT_SPEED are then transmitted to the computing unit 6 comprising the microprocessor 61.

The microprocessor 61 thus receives data from the planning module 4 and estimating model 5, concerning a first path of the autonomous vehicle 100 defined in particular by the following data:

a modeled value of the yaw rate MOD_YR of the autonomous vehicle 100, a modeled value of the lateral velocity MOD_LAT_SPEED of the autonomous vehicle 100, and a reference path REF_TRAJ comprising a reference yaw rate YR REF.

The microprocessor 61 generates a virtual reference path VR_TRAJ and transmits it to the module 7 for controlling lateral movement. The virtual reference path VR_TRAJ in particular comprises a virtual reference yaw rate VR_YR.

In the remainder of this document, the virtual reference path VR_TRAJ is denoted the "virtual path VR_TRAJ" and the virtual reference yaw rate VR_YR is denoted the "virtual yaw rate VR_YR".

As will be seen in the remainder of this document, the virtual path VR_TRAJ is a path computed from the reference path REF_TRAJ delivered by the planning module 4. These are computed to meet different constraints: the reference path REF_TRAJ delivered by the planning module 4 optimizes the comfort of the users of the vehicle, while the virtual path VR_TRAJ optimizes the speed of execution of the lane-change maneuver.

Figure 4:
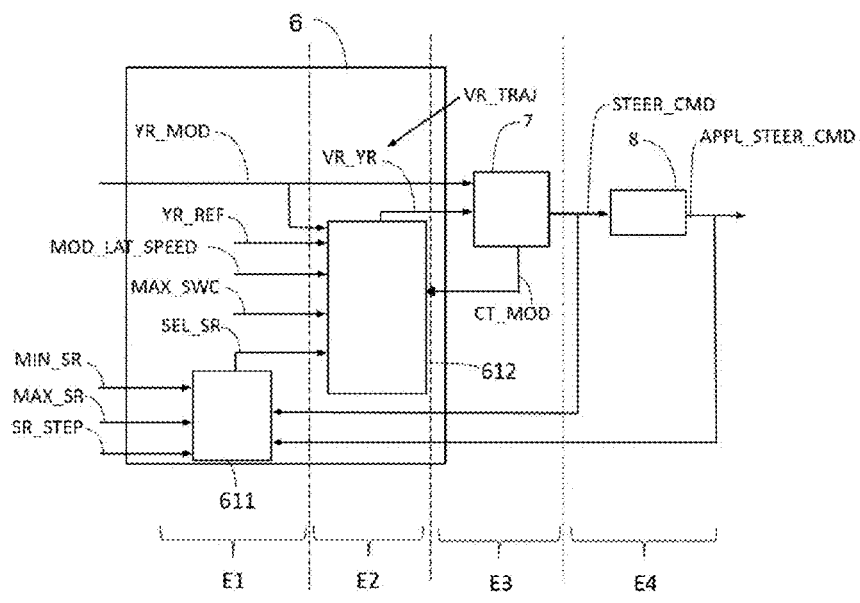
FIG. 4 shows a functional architecture of a guiding device according to the invention.

As is more specifically illustrated in FIG. 4, to compute the virtual path VR_TRAJ, the microprocessor 61 further receives a model CT_MOD of the control module 7, a steering command STEER_CMD delivered by a first feedback loop B1 from the output of the control module 7, and, an applied steering command APP_STEER_CMD delivered by a second feedback loop B2 from the output of the steering system 8.

The model CT_MOD of the control module 7 is used in the processing carried out to optimize the speed of execution of the lane-change maneuver, in particular in step E2 of the guiding method according to the invention.

The steering command STEER_CMD is determined by the control module 7 from the virtual path VR_TRAJ delivered by the microprocessor 6. The steering command STEER_CMD in particular comprises an angle of rotation of the steering wheel of the autonomous vehicle 100.

The steering command STEER_CMD is then transmitted to the steering system 8. The steering system advantageously comprises an electric power-assisted steering system EPS, which converts the steering command STEER_CMD into a movement, in particular a rotational movement, of a control shaft connected to the wheels 9, for example by way of a rack. The rotational movement of the control shaft employed by the power-assisted steering system EPS is measured. A measurement APPL_STEER_CMD of an actually applied angle of rotation of the steering wheel is thus obtained at the output of the steering system 8.

In the described embodiment, the steering command STEER_CMD is equivalent to an angle of rotation of a steering wheel, and in particular of a virtual steering wheel. In the described embodiment, the measurement APPL_STEER_CMD is likewise equivalent to an angle of rotation of the steering wheel, in particular the virtual steering wheel. Alternatively, these quantities could be equivalent to a steering angle of the steered wheels.

In one preferred embodiment, the steering system 8 limits the absolute value of the yaw rate of the motor vehicle to a maximum yaw rate MAX_YR_ABS.

In addition, in this embodiment of the steering system 8, the rate of change in yaw rate is between a minimum value of the rate of change in yaw rate MIN_SR and a maximum value of the rate of change in yaw rate MAX_SR, the rate of change in yaw rate being incremented by an adjustment increment SR_STEP.

In the remainder of the document, the term "rate of change in yaw rate SEL_SR" or "selected rate of change SEL_SR" or "rate of change SEL_SR" designates, in absolute value, the maximum change (in radians per second) that the yaw rate may undergo in a step in which it changes. As will be seen in the remainder of this document, the rate of change SEL_SR varies during implementation of the invention, this meaning that the yaw rate of the vehicle increases or decreases relatively rapidly in the course of the guiding method according to the invention. In each iteration of the guiding method, the rate of change SEL_SR is recomputed in order to define the maximum change in absolute value that the yaw rate may undergo in this iteration of the method.

In one embodiment, the microprocessor 61 makes it possible to execute a software package comprising the following modules communicating with one another:

a module 610 for activating guidance, a module 611 for selecting a rate of change in yaw rate, which collaborates with the control module 7, and the steering system 8, a module 612 for maximizing a virtual reference yaw rate, which collaborates with the planning module 4, the estimating model 5, and the control module 7, a module 613 for transmitting the virtual reference yaw rate transmission, which collaborates with the control module 7.

Figure 5:
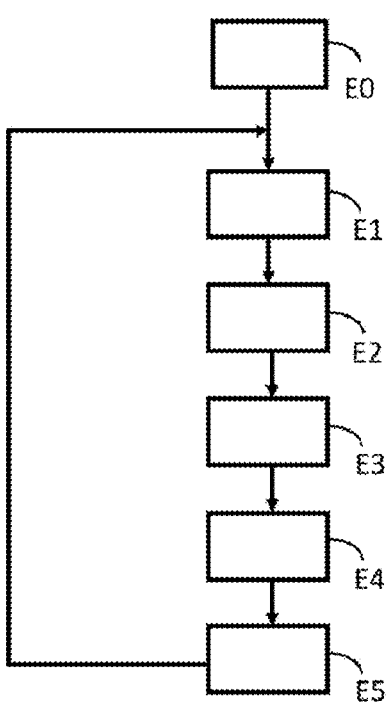
FIG. 5 is a flowchart of a guiding method according to the invention.

A mode of execution of the guiding method is described below with reference to FIG. 5. This method may be considered to be a method for operating a guiding device such as described above or to be a method for operating a vehicle such as described above.

The method comprises iteration of five successive steps, E1, E2, E3, E4, and E5. The Nth iteration of steps E1 to E5 is described below.

The first iteration (N=1) is advantageously preceded by a step E0 of activating guidance with a view to implementing a rapid lane change according to the invention.

In step E0, it is verified whether at least one criterion for activating a rapid lane change is met.

In one embodiment, activation of a rapid lane change could be transmitted via a message delivered by a deciding module of the autonomous vehicle 100 (not described in this document).

Next, following the activating step E0, a first iteration of step E1 is carried out.

In the first step E1, described with reference to FIG. 6, a rate of change in yaw rate $SEL\_SR_N$ is selected.

Figure 6:
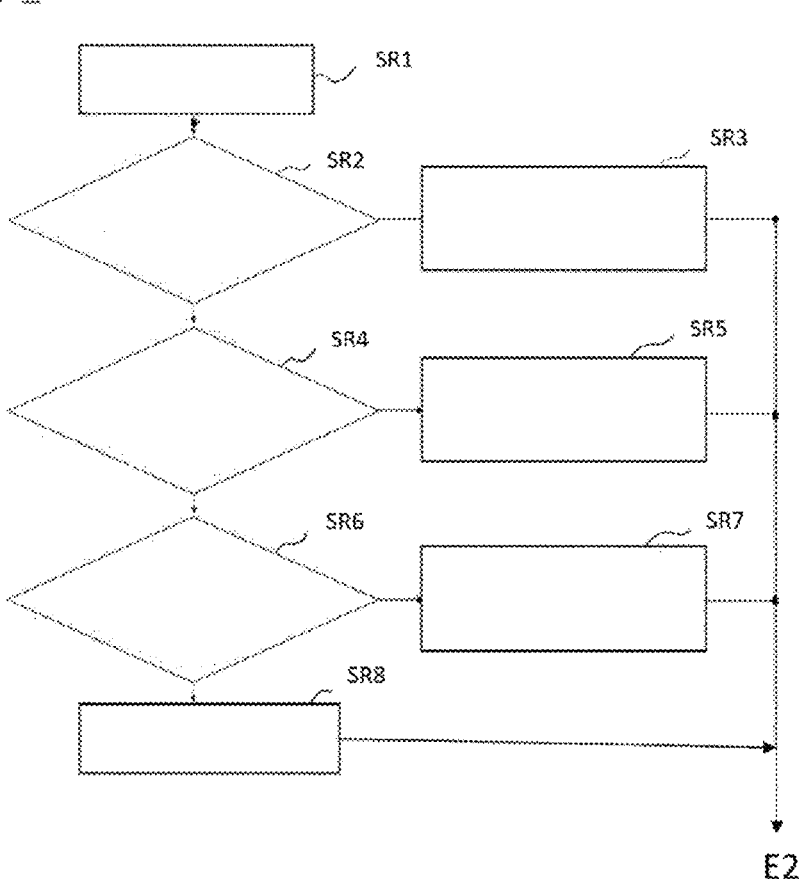
FIG. 6 illustrates an algorithm for selecting a rate of change in yaw rate of the motor vehicle.

In the first iteration of the method (N=1), corresponding to step SR1 illustrated in FIG. 6, the rate of change $SEL\_SR_N$ is set to the minimum value MIN_SR. The current value of the rate of change $SEL\_SR_N$ is recorded in the memory 62, then the second step E2 is passed to.

In subsequent iterations of the method (N>1), the first step E1 comprises a first sub-step of receiving E11 a first steering command $STEER\_CMD_{N-1}$ sent by the module 7 for controlling lateral movement in a previous iteration of the method, a second sub-step of receiving E12 a second steering command $APP\_STEER\_CMD_{N-1}$ applied by the steering system 8 in said previous iteration of the method, and a third sub-step E13 of computing the rate of change in yaw rate $SEL\_SR_N$ depending on a previous rate of change in yaw rate ($SEL\_SR_{N-1}$) computed in the previous iteration of the method, on the minimum value of the rate of change in yaw rate MIN_SR, on the maximum value of the rate of change in yaw rate MAX_SR, on the set adjustment increment SR_STEP, and on a difference between the first and second steering commands $STEER\_CMD_{N-1}$, $APP\_STEER\_CMD_{N-1}$.

In one embodiment, the commands STEER_CMD and APP_STEER_CMD are expressed in degrees and correspond to an angle of rotation of the steering wheel of the autonomous vehicle 100.

After receiving the first and second steering commands $STEER\_CMD_{N-1}$/$APP\_STEER\_CMD_{N-1}$ the sub-step E13 of computing the rate of change $SEL\_SR_N$ depending on the minimum value of the rate of change in yaw rate MIN_SR, on the maximum value of the rate of change in yaw rate MAX_SR, on the set increment SR_STEP in the variation in the rate of change in yaw rate, and on the discrepancy between the first and second steering commands $STEER\_CMD_{N-1}$, $APP\_STEER\_CMD_{N-1}$ is passed to.

Sub-step E13 is described with reference to steps SR2 to SR8 illustrated in FIG. 6.

In step SR2, the current value of the rate of change in yaw rate, i.e. the value employed in the previous iteration $SEL\_SR_{N-1}$, is retrieved from the memory 62.

Next, it is tested whether the following two conditions are met:

the absolute value of the first command $STEER\_CMD_{N-1}$ is strictly greater than the absolute value of the second command $APP\_STEER\_CMD_{N-1}$, and the rate of change in yaw rate $SEL\_SR_{N-1}$ is strictly greater than the minimum value of the rate of change in yaw rate MIN_SR.

If these two conditions are met, then step SR3 is passed to, in which the value of the rate of change in yaw rate is updated by applying the following calculation:

$SEL\_SR_N=SEL\_SR_{N-1}$-SR_STEP, then the new value $SEL\_SR_N$ of the rate of change is recorded in the memory 62 and step E2 is passed to.

Otherwise, step SR4 is passed to, in which it is tested whether the following two conditions are met:

the absolute value of the first command $STEER\_CMD_{N-1}$ is strictly less than the absolute value of the second command $APP\_STEER\_CMD_{N-1}$, and the rate of change in yaw rate $SEL\_SR_{N-1}$ is strictly greater than the minimum value of the rate of change in yaw rate MIN_SR.

If these two conditions are met, then step SR5 is passed to, in which the value of the rate of change in yaw rate is updated by applying the following calculation:

$SEL\_SR_N=SEL\_SR_{N-1}$-SR_STEP, then the new value $SEL\_SR_N$ of the rate of change is recorded in the memory 62 and step E2 is passed to.

Otherwise, step SR6 is passed to, in which it is tested whether the following two conditions are met:

the absolute value of the first command $STEER\_CMD_{N-1}$ is equal to the absolute value of the second command $APP\_STEER\_CMD_{N-1}$, and the rate of change in yaw rate $SEL\_SR_{N-1}$ is strictly less than the maximum value of the rate of change in yaw rate MAX_SR.

If these two conditions are met, then step SR7 is passed to, in which the value of the rate of change in yaw rate is updated by applying the following calculation:

$SEL\_SR_N=SEL\_SR_{N-1}$+SR_STEP, then the new value $SEL\_SR_N$ of the rate of change is recorded in the memory 62 and step E2 is passed to.

Otherwise, step SR8 is passed to, in which the value of the rate of change in yaw rate does not change. In other words:

$SEL\_SR_N=SEL\_SR_{N-1}$ then step E2 is passed to.

In other words, the algorithm for computing the rate of change in yaw rate $SEL\_SR_N$ comprises:

comparing the first steering command $STEER\_CMD_{N-1}$ and the second steering command $APP\_STEER\_CMD_{N-1}$ sent in a previous iteration of the method, and comparing the previous rate of change in yaw rate $SEL\_SR_{N-1}$ to the minimum value MIN_SR or to the maximum value MAX_SR of the rate of change in yaw rate.

If the first steering command $STEER\_CMD_{N-1}$ is different from the second steering command $APP\_STEER\_CMD_{N-1}$, and if the previous rate of change in yaw rate $SEL\_SR_{N-1}$ is greater than the minimum value MIN_SR, then the rate of change in yaw rate $SEL\_SR_N$ is equal to the difference between the previous rate of change in yaw rate $SEL\_SR_{N-1}$ and the set adjustment increment SR_STEP.

Otherwise, if the first steering command $STEER\_CMD_{N-1}$ is equal to the second steering command $APP\_STEER\_CMD_{N-1}$, and if the previous rate of change in yaw rate $SEL\_SR_{N-1}$ is less than the maximum value MAX_SR, then the rate of change in yaw rate $SEL\_SR_N$ is equal to the sum of the previous rate of change in yaw rate $SEL\_SR_{N-1}$ and of the set adjustment increment SR_STEP.

Otherwise, the rate of change in yaw rate $SEL\_SR_N$ is equal to the previous rate of change in yaw rate $SEL\_SR_{N-1}$.

Thus, in each iteration of the method, in sub-step E13, it is verified whether the previous command applied by the steering system 8 is different from the one determined by the control module 7 in the previous iteration. If such is the case, the rate of change in yaw rate $SEL\_SR_N$ is decreased in order to slow down the command sent by the control module 7. Otherwise, the rate of change in yaw rate $SEL\_SR_N$ is increased to get closer to the maximum capabilities MAX_SWC of the steering system 8. The increases and decreases in the rate of change in yaw rate $SEL\_SR_N$ are made in set increments SR_STEP in each iteration, and while respecting the minimum and maximum allowable bounds MIN_SR and MAX_SR.

In step E2, a virtual reference yaw rate V_REF_YR$_N$ is determined depending on the rate of change in yaw rate SEL_SR$_N$ and on the maximum yaw rate MAX_YR_ABS held in the memory 62.

In the described embodiment, the maximization of the virtual reference yaw rate V_REF_YR$_N$ is based on an optimization calculation the objective of which is to maximize the virtual reference yaw rate V_REF_YR$_N$ while respecting the limits of the autonomous vehicle 100, i.e. the model 5 for estimating the lateral dynamics of the autonomous vehicle 100 and the constants of the steering system 8.

The embodiment described in this document is based on a model of a Renault Zoe. This example is provided by way of illustration and is non-limiting.

The mathematical expression of the optimization problem to be solved in this embodiment of the invention is described below with reference to the formulae Math1 to Math8.

The formulae Math1 to Math4 define a first mathematical model, representing the state of the autonomous vehicle 100.

The formula Math1 corresponds to the spatial state equations of the autonomous vehicle 100.

$$\dot{x}(t) = Ax(t) + Bu(t) \qquad \text{[Math 1]}$$

$$y(t) = Cx(t)$$

where

A, B and C are the spatial state matrices defined by the formula Math4, u(t) is the angle of rotation of the steering wheel defined by the formula Math3, and x(t) is the state vector of the vehicle defined by the formula Math2.

The formula Math2 expresses the state vector x(t) of the autonomous vehicle 100.

$$x(t) = \begin{bmatrix} v_y \\ \psi \end{bmatrix} \qquad \text{[Math 2]}$$

where $v_y$ is the lateral velocity of the autonomous vehicle 100, also referred to elsewhere in this document as the "modeled value of the lateral velocity MOD_LAT_SPEED"; it is expressed in meters per second, and $\psi$ is the yaw rate of the autonomous vehicle 100, also referred to elsewhere in this document as the "modeled value of the yaw rate MOD_YR"; it is expressed in degrees per second.

The formula Math3 expresses the angle of rotation u(t) of the steering wheel of the autonomous vehicle 100.

$$u(t) = \delta \qquad \text{[Math 3]}$$

where $\delta$ is the angle of rotation of the steering wheel in degrees.

The formula Math4 expresses the state matrices A, B, C of the autonomous vehicle 100.

$$A = \begin{bmatrix} -\dfrac{C_f + C_r}{m v_x} & -v_x + \dfrac{C_r L_r - C_f L_f}{m v_x} \\ \dfrac{-L_f C_f + L_r C_r}{I_z v_x} & \dfrac{L_f^2 C_f + L_r^2 C_r}{I_z v_x} \end{bmatrix} \qquad \text{[Math 4]}$$

-continued $$B = \begin{bmatrix} \dfrac{C_f}{m} \\ \dfrac{L_f C_f}{I_z} \end{bmatrix}$$

$$C = [0 \quad 1]$$

where $v_x$ is the longitudinal velocity of the autonomous vehicle 100, $C_f$ and $C_r$ are expressed in newtons per radian (N/rad); these terms, which are related to the dynamics of the vehicle, represent a characteristic of a stiffness in bends, at the front and rear of the vehicle respectively, $L_f$ and $L_r$ are distances expressed in meters (m) measured between the front and rear wheels respectively, and the center of gravity of the autonomous vehicle 100, m is the mass of the vehicle expressed in kilograms (kg), $I_z$ is the inertia of the vehicle about a vertical axis passing through the center of gravity of the vehicle, the inertia being expressed in kilograms per second squared (kg/s$^2$).

The formula Math5 moreover defines a second mathematical model, corresponding to a continuous model of the module 7 for controlling lateral movement. In step E2, optimization of the yaw rate through computation of a virtual reference yaw rate V_REF_YR$_N$ is solved by interconnecting the first and second closed-loop models.

$$\dot{x}_c(t) = A_c x_c(t) + B_c e(t) \qquad \text{[Math 5]}$$

$$\delta(i) = C_c x_c(t) + D_c e(t)$$

where $A_c$, $B_c$, $C_c$, $D_c$ are the state matrices of the module 7 for controlling lateral movement, $x_c(t)$ is the state vector of the module 7 for controlling lateral movement, e(t) is the yaw-rate error fed as input to the module 7 for controlling lateral movement, i.e. the difference, in a previous iteration of the method, between the modeled value of the yaw rate MOD_YR delivered by the model 5 for estimating the lateral dynamics of the vehicle and the virtual reference yaw rate V_REF_YR$_{N-1}$ delivered by the microprocessor 61, and $\delta$ is the output of the module 7 for controlling lateral movement, which is referred to elsewhere in this document as the "the first steering command STEER_CMD$_N$".

The continuous state system thus obtained is discretized with a period of 0.01 seconds, which corresponds to the frequency at which the steering system 8 is able to process commands.

The discretized closed-loop system thus obtained respects equations Math6 and Math7.

$$x_{cl}(k+1) = A_{cl} x_{cl}(k) + B_{cl} v(k) \qquad \text{[Math 6]}$$

$$y_{cl}(k) = C_{cl} x_{cl}(k) + D_{cl} v(k)$$

where x_{cl} is defined by the mathematical expression Math7, $A_{cl}$, $B_{cl}$, $C_{cl}$, $D_{cl}$ are the state matrices of the closed-loop system, v(k) is the virtual reference yaw rate V_REF_YR, and $Y_{cl}$ is the output of the closed-loop system, i.e. the output of the module 7 for controlling lateral movement, or in other words the steering command STEER_CMD.

$$x_{cl} = \begin{bmatrix} x \\ \overline{x_c} \end{bmatrix} \qquad \text{[Math 7]}$$

where x is the spatial state vector of the autonomous vehicle 100, and $x_c$ is the state vector of the module 7 for controlling lateral movement.

The variable v(k), also referred to elsewhere in this document as the "virtual reference yaw rate V_REF_YR", is defined by determining the largest value of K between 0 and 1 respecting the mathematical expression Math8 for any integer i between 1 and N, N being the prediction horizon.

$$\max K \qquad \text{[Math 8]}$$

$$x_{cl}(k+1+i) = A_{cl}x_{cl}(k+i) + B_{cl}v(k)$$

$$Ex_{cl}(k+i) \le D$$

$$v(k) = v(k-1) + K(r(k) - v(k-1))$$

$$|v(k) - v(k-1)| \le D_v$$

where i is an index between 1 and N, k is a discrete time index,

R is reference yaw rate REF_YR, $D_v$ is the rate of change in yaw rate, also referred to elsewhere in this document as the "rate of change in yaw rate SEL_SR_N".

Thus, at the end of the optimization processing, the virtual reference yaw rate V_REF_YR is obtained. Next, step E3 is passed to.

In step E3, the obtained virtual reference yaw rate V_REF_YR is transmitted to the module 7 for controlling lateral movement, then step E4 is passed to.

In step E4, the module 7 for controlling lateral movement generates a steering command STEER_CMD_N from the virtual reference yaw rate V_REF_YR.

In one embodiment, the module 7 for controlling lateral movement consists of a fast controller that minimizes the yaw-rate error e(k), which is considered to be an input to the discretized state-space system thereof illustrated in the formula Math9.

$$x_c(k+1) = A_c x_c(k) + B_c e(k) \qquad \text{[Math 9]}$$

$$\delta(k) = C_c x_c(k) + D_c e(k)$$

$$e(k) = v(k) - \dot{\psi}(k)$$

where $x_c$ is the state vector of f the module 7 for controlling lateral movement, $A_c$, $B_c$, $C_c$, $D_c$ are the state matrices of the module 7 for controlling lateral movement.

This embodiment of the lateral control module 7 corresponds to a conventional controller allowing automated steering maneuvers to be performed. As output, the control system delivers, at each sampling time (for example every one hundredth of a second), a steering command STEER_CMD_N.

The lateral control module 7 transmits the steering command STEER_CMD_N to the steering system 8, then step E5 is passed to.

In step E5, the steering system 8 advantageously controls an electric power-assisted steering system EPS, which converts the steering command STEER_CMD_N received from the lateral control module 7 into a rotational movement of a control shaft connected to the wheels 9. Step E5 comprises a measurement of the command APPL_STEER_CMD applied, which may be a measurement of an angle of rotation of the control shaft.

Figure 7:
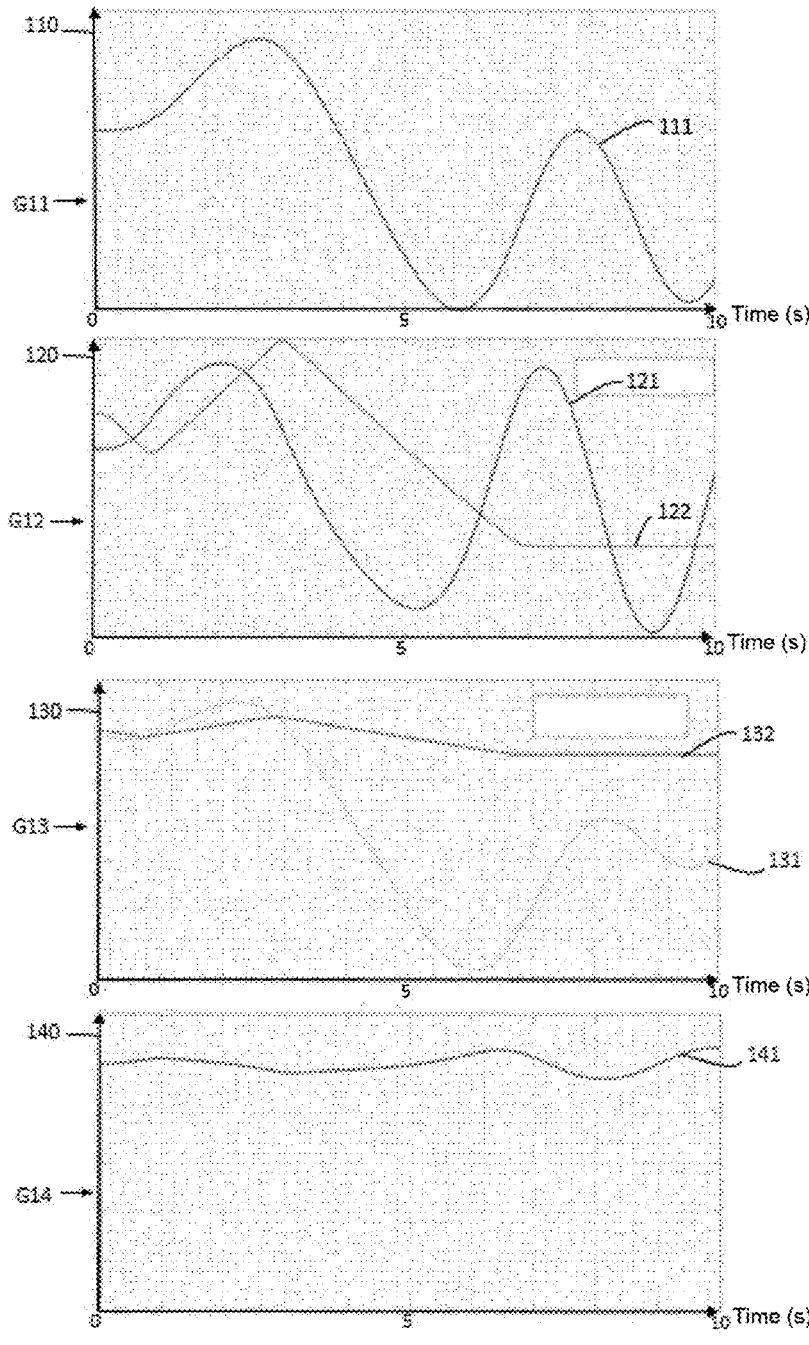
FIG. 7 illustrates a first simulation of a rapid lane change of a first vehicle not equipped with a guiding device according to the invention.
Figure 8:
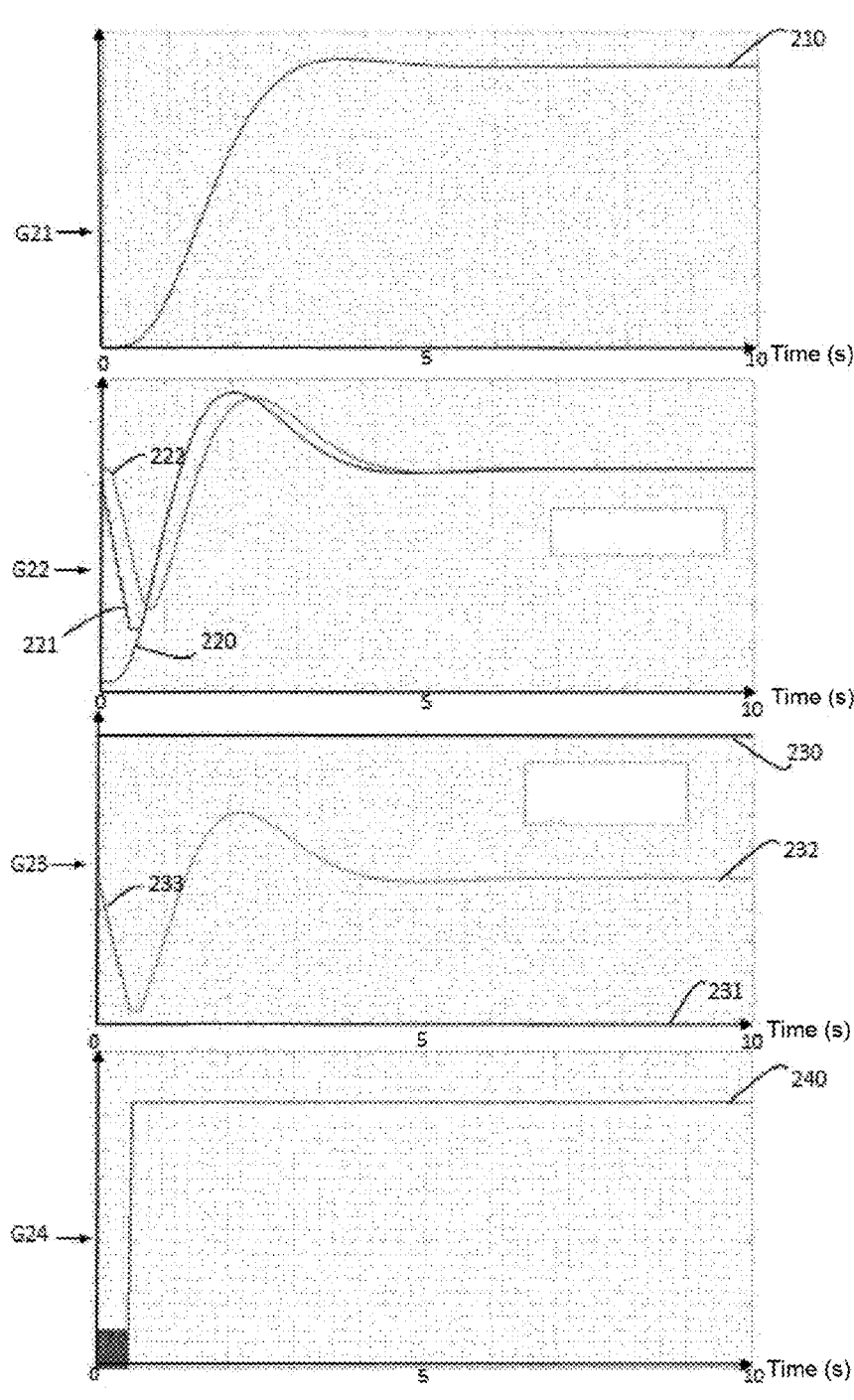
FIG. 8 illustrates a second simulation of a rapid lane change of a second vehicle equipped with a first embodiment of a guiding device according to the invention.
Figure 9:
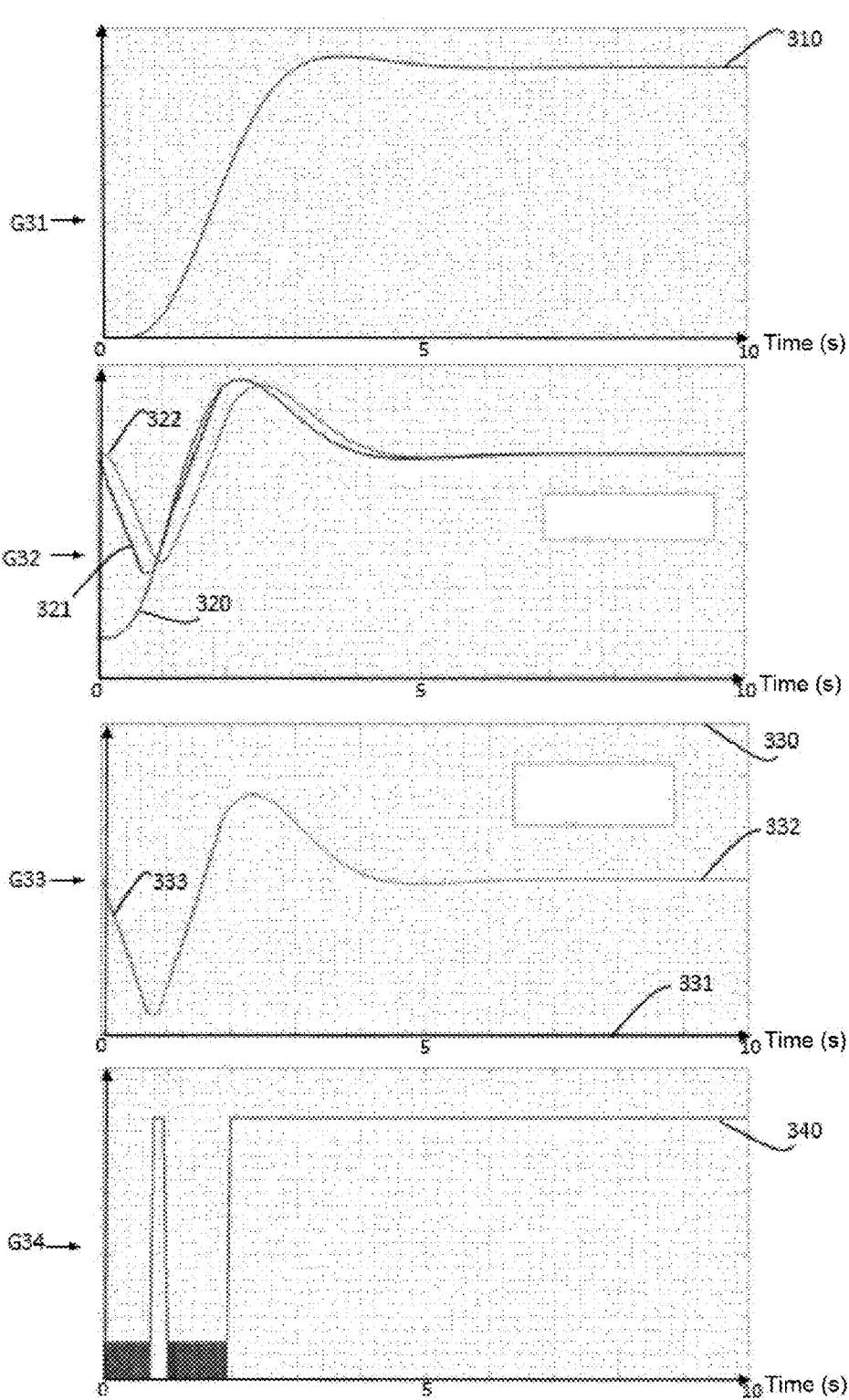
FIG. 9 illustrates a third simulation of a rapid lane change of a third vehicle equipped with a second embodiment of a guiding device according to the invention.

FIGS. 7 to 9 illustrate implementation of the guiding method according to the invention. The data shown were obtained from simulations simulating the fastest possible automated lane change able to be performed by an automated Renault Zoe.

The autonomous vehicle is traveling at a longitudinal velocity of ten meters per second in a first traffic lane and must make a rapid lane change to a second traffic lane. The three simulations differ from one another in a number of criteria.

A first criterion relates to the presence of the invention in the autonomous vehicle:

in the first simulation (FIG. 7), the autonomous vehicle is not equipped with the invention, in the second and third simulations (FIGS. 8 and 9), the autonomous vehicle is equipped with the invention.

A second criterion relates to the lateral distance between the first and second lanes:

in the first two simulations (FIG. 7 and FIG. 8), the center lines of the first and second lanes are separated by a lateral distance of 4 meters, in the third simulation, the center lines of the first and second lanes are separated by a lateral distance of 7 meters.

A third criterion relates to the maximum rotational capabilities of the steering wheel, in the second simulation (FIG. 8), the maximum rotational capabilities of the steering are 100 degrees, while in the third simulation (FIG. 9), the maximum rotational capabilities of the steering are 150 degrees.

The first simulation is described below with reference to FIG. 7. It relates to a first autonomous vehicle not equipped with the invention. The first vehicle makes a rapid lane change between a first traffic lane and a second traffic lane that are separated by a lateral distance of 4 meters. The vehicle is equipped with a fast controller. The term "fast controller" refers to a type of controller used in lane-keeping applications.

Graph G11 plots the variation as a function of time in the lateral movement in meters (on the y-axis 110) of the first autonomous vehicle. As shown by curve 111, the first vehicle begins the lane change at a lateral distance of 4 meters from the reference lane, and fails to converge on the second lane located at a y-coordinate of 0. Instead, the first vehicle oscillates about the second lane at the beginning of the maneuver and then becomes unstable.

Graph G12 contains two curves:

curve 121 plots the variation as a function of time in the yaw rate (expressed in radians per second on the y-axis 120) of the first autonomous vehicle, curve 122 plots the reference yaw rate such as defined by the planning module.

Curves 121, 122 show that the first vehicle is not able to respect the reference yaw-rate setpoint sent by the planning module.

Graphs G13 and G14 allow why the first vehicle is unable to apply the reference yaw rate sent by the planning module to be understood.

Specifically, graph G13 illustrates the variation as a function of time in the angle of rotation of the steering wheel (expressed in degrees on the y-axis 130):

curve 131 shows the variation as a function of time in the steering command delivered by the fast controller, and curve 132 shows the variation as a function of time in the steering command applied by the first vehicle, which is much slower than the variation shown by curve 131.

The bandwidth of the controller generates a fast steering command that exceeds the steering capabilities of the steering system.

Furthermore, graph G14 illustrates the variation as a function of time in the rate of change in the reference yaw rate (expressed in radians per second on the y-axis 141). Curve 141 illustrates an abrupt and discontinuous change at the beginning of the maneuver (t=0s) of the first vehicle. A fast controller cannot implement such a change in yaw rate.

The second and third simulations illustrate the effect of the guiding method according to the invention. With implementation of the invention, the controller was able to implement a maximized virtual reference yaw rate while respecting the limits of the steering system of the vehicle.

The second simulation is described below with reference to FIG. 8. It relates to a second autonomous vehicle equipped with the invention. The second vehicle performs the same maneuver as the first vehicle, i.e. a rapid lane change between a first traffic lane and a second traffic lane separated by a lateral distance of 4 meters.

Graph G21 plots the variation as a function of time in the lateral movement in meters of the second autonomous vehicle. The second vehicle begins the lane change at a lateral distance of 4 meters from the reference lane, and converges in three seconds to the second lane located at a y-coordinate of 0. The amplitude of the initial oscillation with respect to the target y-coordinate (0 meters) is limited to 0.2 meters.

Graph G22 contains three curves:

curve 220 plots the variation as a function of time in the reference yaw rate such as defined by the planning module, curve 221 plots the variation as a function of time in the virtual reference yaw rate such as defined by the guiding method according to the invention, curve 222 plots the variation as a function of time in the yaw rate implemented by the second autonomous vehicle.

The proximity of curves 221 and 222 shows that the second vehicle is able to apply the virtual reference yaw rate.

Specifically, it may be seen that between t=0 seconds and t=0.6 seconds, the absolute value of the virtual reference yaw rate increases gradually, this allowing the second vehicle to apply the yaw-rate setpoint, whereas, at t=0 seconds, the reference yaw rate 220 delivered by the planning module is very far from the yaw rate implemented by the second vehicle, the virtual reference yaw rate varies gradually to join, at t=0.6 seconds, curve 222 representing the reference yaw rate such as defined by the planning module, at t=5 seconds, the yaw rate implemented by the second vehicle converges to the reference yaw rate such as defined by the planning module.

Graph G23 illustrates the variation as a function of time in the angle of rotation of the steering wheel:

curve 230 shows the lower limit of the angle of rotation of the steering wheel of the second vehicle, i.e. −100 degrees, curve 231 shows the upper limit of the angle of rotation of the steering wheel of the second vehicle, i.e. +100 degrees, curve 232 shows the variation as a function of time in the steering command applied by the second vehicle, curve 233 shows the variation as a function of time in the steering command delivered by the fast controller.

The steering command generated by the fast controller respects the steering capabilities of the steering system. The steering command applied 232 by the first vehicle therefore respects command 233 delivered by the controller.

Furthermore, graph G24 illustrates the variation as a function of time in the rate of change in the virtual reference yaw rate. Curve 240 illustrates a gradual variation in the virtual reference yaw rate at the beginning of the maneuver of the second vehicle, which allows the controller to follow this variation.

The third simulation is described below with reference to FIG. 9. It relates to a third autonomous vehicle equipped with the invention. The third vehicle performs a maneuver that generates a larger lateral deviation than the first and second simulations, since it is a question of a rapid lane change between a first traffic lane and a second traffic lane separated by a lateral distance of 7 meters. The lower and upper limits of the angle of rotation of the steering wheel of the third vehicle are −150 degrees and +150 degrees, respectively.

Graph G31 plots the variation as a function of time in the lateral movement in meters of the second autonomous vehicle. The third vehicle begins the lane change at a lateral distance of 7 meters from the reference lane, and converges in five seconds to the second lane located at a y-coordinate of 0. The amplitude of the initial oscillation with respect to the target y-coordinate (0 meters) is limited to 0.2 meters.

Graph G32 contains three curves:

curve 320 plots the variation as a function of time in the reference yaw rate such as defined by the planning module, curve 321 plots the variation as a function of time in the virtual reference yaw rate such as defined by the guiding method according to the invention, curve 322 plots the variation as a function of time in the yaw rate implemented by the third autonomous vehicle.

The proximity of curves 321 and 322 shows that the second vehicle is able to approach the virtual reference yaw rate. Specifically, it may be seen that between t=0 seconds and t=0.8 seconds, the absolute value of the virtual reference yaw rate increases gradually, this allowing the third vehicle to apply the yaw-rate setpoint, whereas, at t=0 seconds, the reference yaw rate 320 delivered by the planning module is very far from the yaw rate implemented by the second vehicle, the virtual reference yaw rate varies gradually to join, at t=0.8 seconds, curve 322 representing the reference yaw rate such as defined by the planning module, at t=5 seconds, the yaw rate implemented by the third vehicle converges to the reference yaw rate such as defined by the planning module.

Graph G33 illustrates the variation as a function of time in the angle of rotation of the steering wheel:

curve 330 shows the lower limit of the angle of rotation of the steering wheel of the third vehicle, i.e. −150 degrees, curve 331 shows the upper limit of the angle of rotation of the steering wheel of the third vehicle, i.e. +150 degrees, curve 332 shows the variation as a function of time in the steering command applied by the third vehicle, curve 333 shows the variation as a function of time in the steering command delivered by the fast controller.

The steering command generated by the fast controller respects the steering capabilities of the steering system. The steering command applied 332 by the first vehicle therefore respects command 333 delivered by the controller.

Graphs G32 and G33 also illustrate the effect of gradual modification of the rate of change in yaw rate. The absolute value of the virtual reference yaw rate increases to reach a plateau at around t=0.65 seconds. Between t=0.65 seconds and t=0.8 seconds the virtual reference yaw rate is constant, as is the angle of rotation of the steering wheel of the third vehicle. The vehicle has then reached the maximum capabilities of the steering system.

Furthermore, graph G34 illustrates the variation as a function of time in the rate of change in the virtual reference yaw rate. Curve 340 shows that the rate of change in yaw rate was reduced only over two short periods (each less than one second) at the beginning of the maneuver.

As was illustrated by the three simulations presented, the method according to the invention has been tested in a simulator developed by Renault, which uses the driving parameters of an automated Renault Zoe, allowing the performance of the system to be evaluated reliably.

The results obtained in the simulations show that the guiding method according to the invention provides a solution to one of the main limitations of automated steering-wheel maneuvers, which is to optimize both the dynamics of the vehicle and the maximum capabilities of the steering wheel in autonomous mode, while still driving safely.

In particular, the guiding method according to the invention makes it possible to simultaneously manage rapid lane-change maneuvers, between first and second traffic lanes, in particular when the lateral distance between the first and second lanes is large, the limitation of the maximum steering command due to the operation of the electric power-assisted steering; and exploitation of the maximum rotation-rate capacities of the steering wheel.

Thus, the guiding method according to the invention allows the autonomous vehicle to perform a rapid lane-change maneuver while maintaining a stable path throughout the maneuver.

The invention claimed is:

1. A method for guiding a motor vehicle equipped with a velocity sensor, with a gyroscope, with a geolocating system, with a path-planning system, with a controller configured to control lateral movement, with a steering system, and with wheels, the steering system limiting an absolute value of a yaw rate of the motor vehicle to a maximum yaw rate, a rate of change in the yaw rate being between a minimum value of a rate of change in yaw rate and a maximum value of the rate of change in yaw rate, the rate of change in yaw rate being incremented by a set adjustment increment, the method comprising iteration of:

selecting a rate of change in yaw rate;

maximizing a virtual reference yaw rate depending on the rate of change in yaw rate and on the maximum yaw rate;

transmitting the virtual reference yaw rate to the controller that is configured to control lateral movement; and generating a first steering command from the virtual reference yaw rate, wherein the selecting comprises:

receiving a first steering command sent by the controller that is configured to control lateral movement in a previous iteration of the method, receiving a second steering command applied by the steering system in the previous iteration of the method, and computing the rate of change in yaw rate depending on a difference between the first steering command and the second steering command.

2. The guiding method as claimed in claim 1, further comprising, following the transmitting, converting, via the steering system, the first steering command into a second steering command consisting of a movement of a steering shaft connected to the steered wheels.

3. The guiding method as claimed in claim 1, wherein the computing the rate of change in yaw rate further depends on a previous rate of change in yaw rate computed in the previous iteration of the method, on the minimum value of the rate of change in yaw rate, on the maximum value of the rate of change in yaw rate, and on the set adjustment increment.

4. The guiding method as claimed in claim 3, wherein the computing the rate of change in yaw rate comprises:

comparing the first steering command and the second steering command sent in a previous iteration of the method, and comparing the previous rate of change in yaw rate to the minimum value of the rate of change in yaw rate, wherein:

when the first steering command is different from the second steering command, and when the previous rate of change in yaw rate is greater than the minimum value, then the rate of change in yaw rate is equal to the difference between the previous rate of change in yaw rate and the set adjustment increment, otherwise when the first steering command is equal to the second steering command, and when the previous rate of change in yaw rate is less than the maximum value, then the rate of change in yaw rate is equal to a sum of the previous rate of change in yaw rate and of the set adjustment increment, otherwise the rate of change in yaw rate is equal to the previous rate of change in yaw rate.

5. The guiding method as claimed in claim 1, wherein the steering system is configured to process commands delivered by the controller that is configured to control lateral movement at a frequency less than or equal to a maximum processing frequency, and the maximizing the virtual reference yaw rate comprises:

modeling a continuous closed-loop system comprising a continuous state model of the motor vehicle and a continuous model of the controller that is configured to control lateral movement, defining a discretized closed-loop system by discretizing the model of the continuous closed-loop system at a frequency less than or equal to the maximum processing frequency, and determining the virtual reference yaw rate via an optimization calculation.

6. The guiding method as claimed in claim 5, wherein the optimization calculation maximizes the virtual reference yaw rate.

7. A device for guiding a motor vehicle, the device comprising;

circuitry configured to select a rate of change in yaw rate, maximize a virtual reference yaw rate depending on the rate of change in yaw rate and on a maximum yaw rate, transmit the virtual reference yaw rate to a controller that is configured to control lateral movement, and generate a first steering command from the virtual reference yaw rate, wherein the circuitry is configured to select the rate of change in yaw rate by:

receiving a first steering command sent by the controller that is configured to control lateral movement in a previous iteration, receiving a second steering command applied by a steering system in said previous iteration, and computing the rate of change in yaw rate depending on a difference between the first steering command and the second steering command.

8. A non-transitory computer readable medium storing a program that, when executed by a computer, causes the computer to execute the guiding method as claimed in claim 1.

\* \* \* \* \*